(12) United States Patent
Ranjan et al.

(10) Patent No.: US 10,075,563 B2
(45) Date of Patent: Sep. 11, 2018

(54) NETWORK AND VIDEO/AUDIO SYSTEM AND METHOD FOR GAMING AND VIRTUAL REALITY

(71) Applicant: Gridraster, Inc., Palo Alto, CA (US)

(72) Inventors: Rishi Ranjan, Palo Alto, CA (US); Yaranama Venkata Ramana Dass, Palo Alto, CA (US)

(73) Assignee: GRIDRASTER, INC., Palo Alto, CA (US)

( * ) Notice: Subject to any disclaimer, the term of this patent is extended or adjusted under 35 U.S.C. 154(b) by 85 days.

(21) Appl. No.: 15/016,890

(22) Filed: Feb. 5, 2016

(65) Prior Publication Data
US 2017/0230482 A1    Aug. 10, 2017

(51) Int. Cl.
*H04L 29/06* (2006.01)
*H04L 29/08* (2006.01)
*G06T 19/00* (2011.01)
*A63F 13/25* (2014.01)

(52) U.S. Cl.
CPC .............. *H04L 67/42* (2013.01); *A63F 13/25* (2014.09); *G06T 19/006* (2013.01); *H04L 67/104* (2013.01); *G06T 2219/024* (2013.01)

(58) Field of Classification Search
CPC ....... H04L 67/104; H04L 67/06; H04L 67/10; H04L 67/1076; H04L 67/1021; H04L 67/42; H04L 65/607; H04N 21/4788; H04N 21/632; H04N 21/8456; A63F 13/25; G06T 19/006; G06T 2219/024

USPC .......... 709/203, 217, 201, 219, 231; 725/62; 718/104

See application file for complete search history.

(56) References Cited

U.S. PATENT DOCUMENTS

| | | | | |
|---|---|---|---|---|
| 6,160,808 | A * | 12/2000 | Maurya | H04L 29/06 370/389 |
| 8,126,985 | B1 * | 2/2012 | Kandekar | A63F 13/34 345/418 |
| 9,659,400 | B2 * | 5/2017 | Urbach | G06T 15/005 |
| 9,729,452 | B2 * | 8/2017 | Averi | H04L 47/125 |
| 9,860,345 | B1 * | 1/2018 | Testa | H04L 67/42 |
| 2002/0003881 | A1 * | 1/2002 | Reitmeier | H04L 9/34 380/210 |
| 2003/0065817 | A1 * | 4/2003 | Benchetrit | H04L 29/06 709/245 |
| 2005/0027870 | A1 * | 2/2005 | Trebes, Jr. | H04B 1/715 709/227 |
| 2005/0047427 | A1 * | 3/2005 | Kashima | H04B 7/2628 370/441 |
| 2006/0050697 | A1 * | 3/2006 | Li | H04L 29/06027 370/389 |
| 2006/0080454 | A1 * | 4/2006 | Li | H04L 65/4084 709/231 |
| 2006/0098662 | A1 * | 5/2006 | Gupta | H04L 1/0041 370/401 |
| 2006/0159079 | A1 * | 7/2006 | Sachs | H04L 1/1678 370/389 |
| 2007/0130585 | A1 * | 6/2007 | Perret | H04N 7/17318 725/46 |

(Continued)

*Primary Examiner* — Alina A Boutah
(74) *Attorney, Agent, or Firm* — DLA Piper LLP (US)

(57) ABSTRACT

A wireless network and video/audio system and method for gaming and virtual reality are provided. The system and method intelligently harnesses the computing power of network of local-devices and the cloud to make powerful computing possible, anywhere.

13 Claims, 14 Drawing Sheets

(56) References Cited

U.S. PATENT DOCUMENTS

| | | | |
|---|---|---|---|
| 2007/0140171 A1* | 6/2007 | Balasubramanian | ........................ H04W 36/02 370/331 |
| 2007/0245010 A1 | 10/2007 | Arn et al. | |
| 2008/0162670 A1* | 7/2008 | Chapweske | ............... G06F 8/65 709/219 |
| 2009/0182815 A1* | 7/2009 | Czechowski, III | ... H04L 67/104 709/206 |
| 2009/0248872 A1* | 10/2009 | Luzzatti | ............ H04L 29/06027 709/226 |
| 2009/0254659 A1 | 10/2009 | Li et al. | |
| 2009/0310485 A1* | 12/2009 | Averi | ....................... H04L 45/00 370/232 |
| 2010/0014528 A1* | 1/2010 | Amir | ...................... H04L 45/04 370/400 |
| 2010/0146136 A1* | 6/2010 | Lou | ......................... H04L 65/80 709/231 |
| 2011/0158311 A1* | 6/2011 | Abadir | ............... H04N 21/4788 375/240.01 |
| 2012/0016965 A1* | 1/2012 | Chen | ................ H04N 21/23439 709/219 |
| 2012/0221640 A1* | 8/2012 | Cohen | ............... H04L 29/08333 709/204 |
| 2017/0155590 A1* | 6/2017 | Dillon | .................... H04L 47/24 |

\* cited by examiner

412

| GPI - Gap Index | Type |
| --- | --- |
| GRPDU-Sequence number | Presentation Timestamp |
| Input Timestamp | Future Fields |
| DATA ||

FIGURE 6

NETWORK AND VIDEO/AUDIO SYSTEM AND METHOD FOR GAMING AND VIRTUAL REALITY

FIELD

The disclosure relates generally to a wireless network and in particular to a wireless network used in gaming, artificial intelligence or facial recognition.

BACKGROUND

Various forms of gaming have always been very popular. Modernly, a significant amount of gaming is done on home computers in which users play alone or play collaboratively. In most cases, a relatively computationally powerful computer must be used to provide the proper gaming experience for the user. Typically, a lower end computing device could not be used for gaming since the lower end computing device failed to have sufficient computing power to handle the demands of gaming including the graphics, audio and game play. It is desirable to provide a system that allows these lower end computing devices to the uses for gaming or other computationally intensive applications such as virtual reality, artificial intelligence or facial recognition.

BRIEF DESCRIPTION OF THE DRAWINGS

FIG. 6 illustrates more details of the ReSequencer Packet data unit (GRPDU) that is part of the grid raster network and system.

DETAILED DESCRIPTION OF ONE OR MORE EMBODIMENTS

The disclosure is particularly applicable to a network for use in gaming and virtual reality applications and it is in this context that the disclosure will be described. It will be appreciated, however, that the system and method has greater utility since it can be used with other applications in which it is desirable to be able to use lower end computing devices (or provide a fuller experience of higher end computing devices) with those high computing power applications.

The system and method provide a technology platform that intelligently harnesses the computing power of a network of local-devices and cloud to make powerful computing possible, anywhere. The system and method enables gaming on lower end devices and provide the user with a fuller gaming experience on higher end (recommended) devices.

Figure 1:
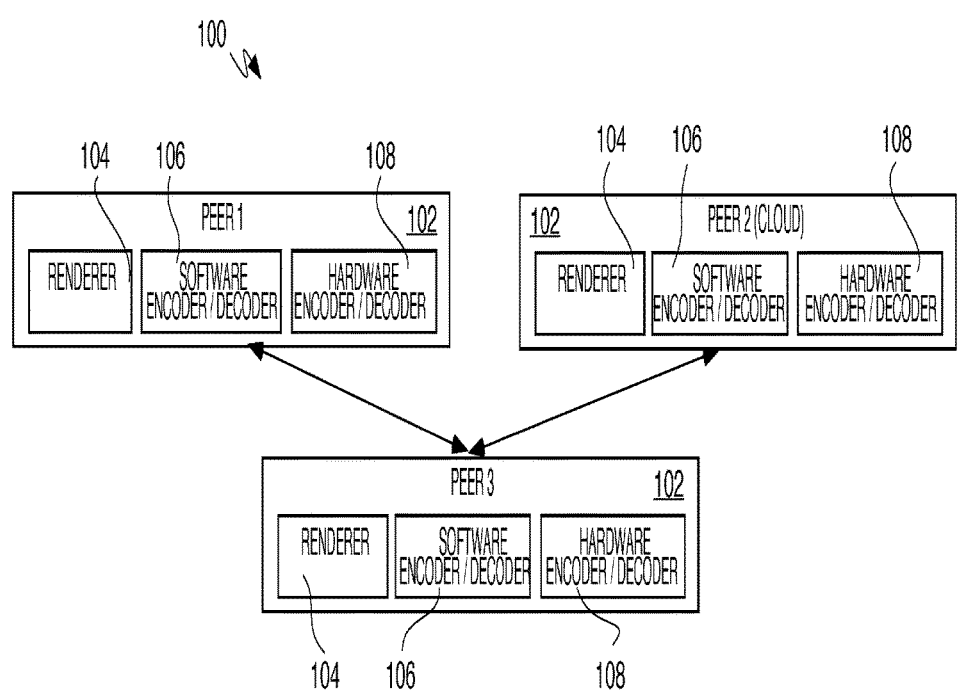
FIG. 1 illustrates an example of an implementation of a grid raster network and system.

FIG. 1 illustrates an example of an implementation of a grid raster network and system 100. More specifically, FIG. 1 show an example of a configuration of the GridRaster network 100 having one or more peers 102, but the system 100 may be extended to as many peer systems as possible and the system is not limited to any particular number of peers. As shown, the peers may be interconnected in various manners, such as in the manner as shown in FIG. 1 in which Peer 1 and Peer 2 are each connected to Peer 3. Each peer may be one or more computing resources such as a processor, memory, a sensor, a server computer, a cloud computing resource and the like. Each peer, in this example, may include a renderer 104 that can perform a known rendering process for rendering a piece of content such as video, a software implemented encoder/decoder 106 that can encode or decode data in a known manner and a hardware implemented encoder/decoder 108 that can encode or decode data in a known manner. The peers 102 may communicate with each other over a network. In one embodiment, the peers 102 may communicate with each other using a wireless network, such as WiFi or any other wireless network, that allows the peers 102 to exchange data and commands with each other as detailed below.

FIG. 1 illustrates that Peer 1 and Peer 2 can provide the extra computation gap required for running a game on Peer 3. The diagram also highlights the configuration where GridRaster can use many video decoders (encoders/decoders) to decode video stream from multiple sources. This is specifically important since most of the devices have a single HW decoder. In one implementation, the GridRaster system 100 uses graphic processing units (GPUs) to implement multiple hardware encoder and decoders 108. In the system 100, the various resources available on peers may be used. For example, data from a sensor from one peer can be communicated to and used by other peers. In addition, in the system 100, a video frame can be transmitted between peers (through connections that exist but are not all shown in FIG. 1) without being compressed which is crucial to maintain lower end to end delay.

Figure 2:
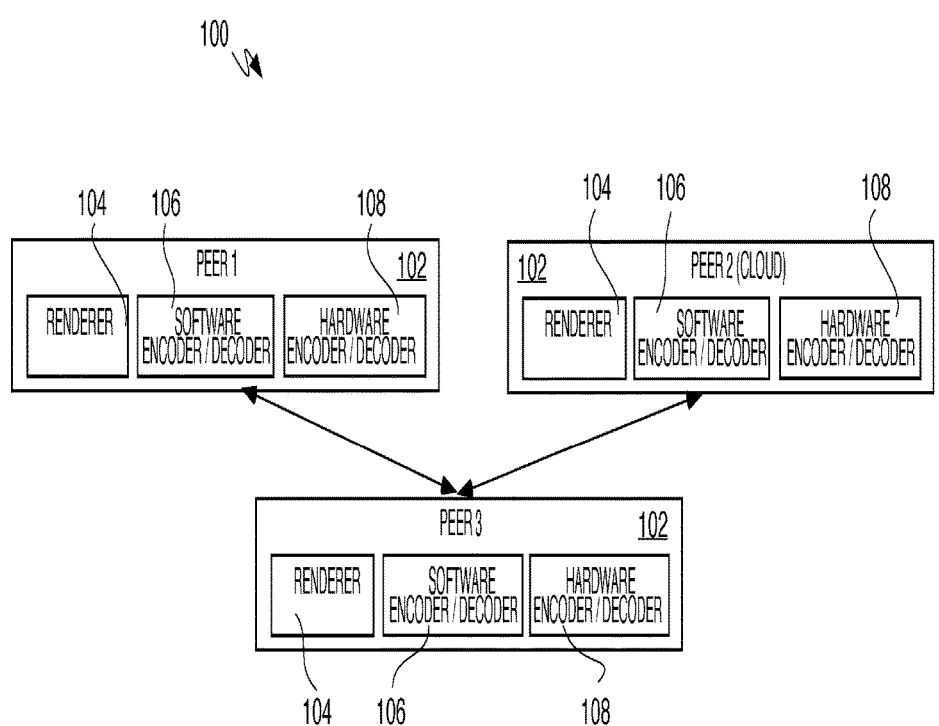
FIG. 2 illustrates an example of the grid raster network and system being used for a single player game.

FIG. 2 illustrates an example of the grid raster network and system 100 being used for a single player game with the same one or more peers 102 as shown in FIG. 1 (with the same components) interconnected. The system 100 in FIG. 2 solves the problem that Peer 3 in FIG. 2 does not have enough computing power to render a high quality game. The system 100 provides a solution in which the following operations and functions may be performed:

Run a copy of the game on the other multiple peers (Peer 1 and Peer 2 in the example in FIG. 2) and stream the frames of the game from the multiple peers to peer 3.

Peer 3 may implement video sync and lip sync.

Peer 3 may synchronize video and audio frames received from the multiple peers.

Figure 3:
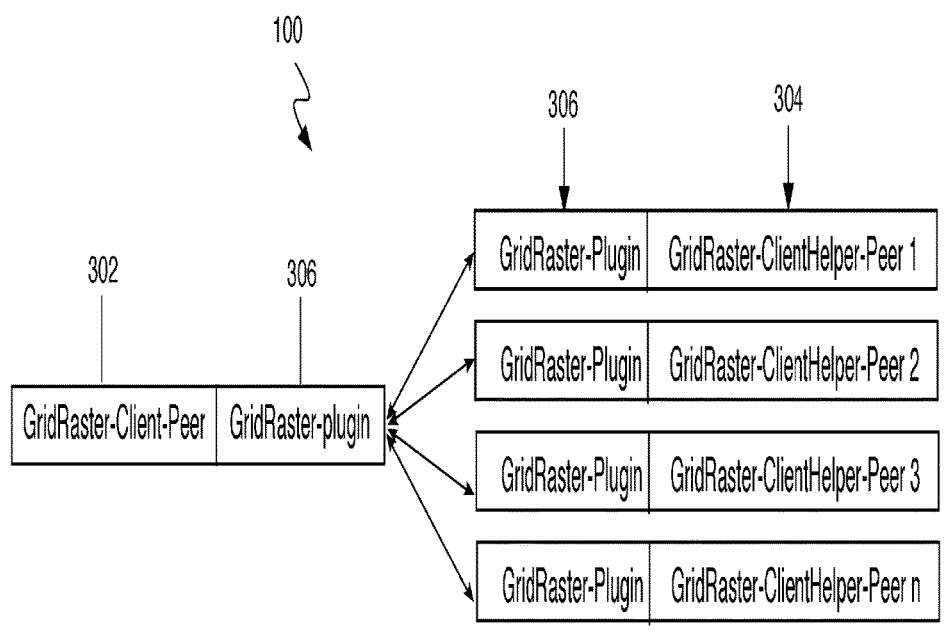
FIG. 3 illustrates more details of the system in FIG. 2.

FIG. 3 illustrates more details of the system 100 in FIG. 2. Each peer may execute or host a client component and each client may use resources from different peers as shown. Each client component may be implemented as a plurality of lines of code being executed by a processor of the peer or as a hardware component, such as a IC, microprocessor and the like, that is hosted by the peer and performs the client operations.

In the system 100, there may be two types of peer clients, one which needs resources and the others which help with these resources. A GridRaster-Client-Peer 302 is a peer that consumes the resources and each GridRaster-ClientHelper-Peer 304 is a peer that shares its resources with GridRaster-Client-Peer 302 as shown in FIG. 3. In each case, each peer also has a GridRaster plug-in 306 that acts as an interface between the client peer, the peer resources and the network.

Figure 4:
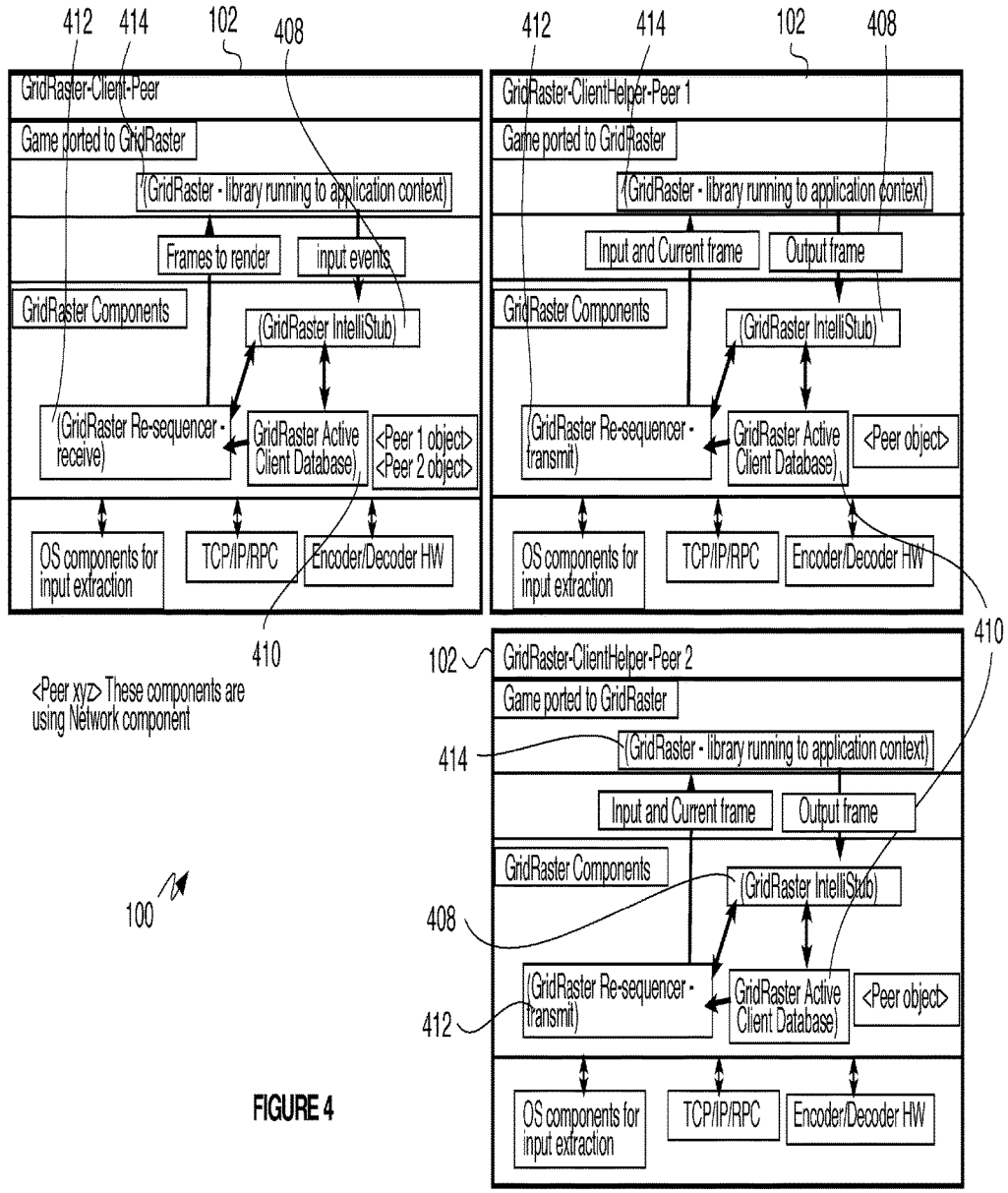
FIG. 4 illustrates further details of the system in FIG. 2.

FIG. 4 illustrates further details of the system in FIG. 2 and in particular each peer 102 of the system. This example shown in FIG. 4 is particularly applicable to the game based application example. The assumption here is that game which will follow this scenario is compiled with the GridRaster library. In the above example there is one GridRaster-Client-Peer 302 and two GridRaster-ClientHelper-Peers 304.

In this example, GridRaster-ClientHelper-Peer 304 are helping GridRaster-Client-peer 302 to achieve higher frames per second (FPS). In this example, frames are generated on the GridRaster-ClientHelper-Peer 304 and sent to the GridRaster-Client-Peer 302 where they are sequenced and the displayed.

Each peer 102 may further include various components and elements that are connected together as shown in FIG. 4. For example, each peer may include an Intellistub component 408 (described in more detail below with reference to FIG. 5) that provides data to the game based on a resequencer 412. The Intellistub 408 also acts as a central server which will define parameters like frames per second (FPS) etc based on current latency etc. Each peer also may include a GridRaster-Active Client Database 410 which stores/holds all the entries of the peers currently involved and a GridRaster ReSequencer Packet data unit (GRPDU) 412 which accumulates data from different peers and provide that data at a constant rate and in order to the peer executing the game. For a peer that is receiving the data from the other peers, the GridRaster ReSequencer Packet data unit (GRPDU) 412 may include a receive component while each peer that is helping the other peer may have a GridRaster ReSequencer Packet data unit (GRPDU) 412 may include a transmit component. In addition, each peer may further include a Gridraster game library component 414 which overrides regular graphic functions of the game with gridraster based calls.

Figure 5:
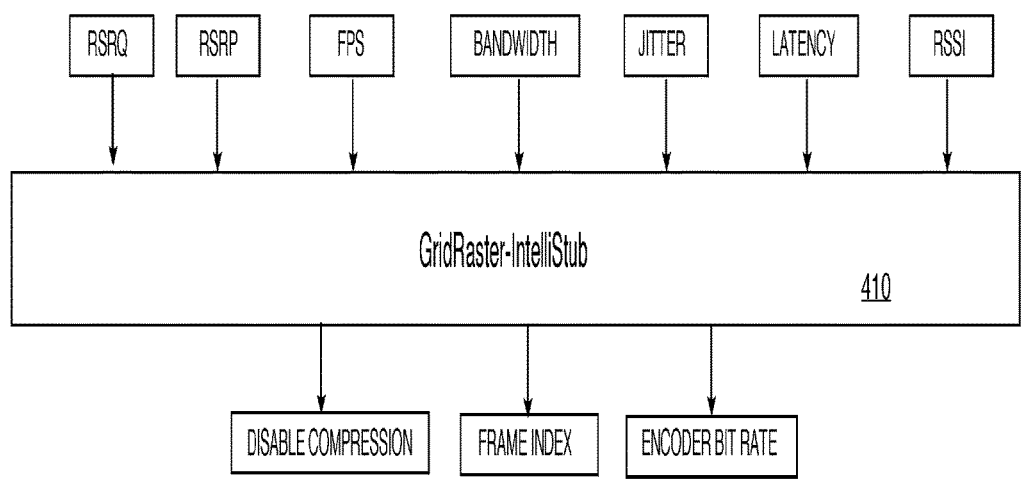
FIG. 5 illustrates more details of the IntelliStub component that is part of the grid raster network and system.

FIG. 5 illustrates more details of the IntelliStub component 408 that is part of the grid raster network and system and of each peer 102 as shown in FIG. 4. The GridRaster-IntelliStub 408 with the help of GridRaster-Active Client Database 410 identifies which peers are favorable to be GridRaster-ClientHelper-Peers 304. The GridRaster-IntelliStub 408 also schedules game rendering on multiple peers based on the statistics it collects for each peer. The component 408 may take the following parameters into account to provide feedback to peer to transmit expected frame:

1. FPS: Frames per second that can be generated by this peer. This is a constant parameter negotiated with a central server of the system. If a receiver of the resequencer 412 wants to schedule more frames per second on the peer, it should negotiate it with a central server/the Intellistub 408.

2. BW: Bandwidth estimate between the peer and receiver of the resequencer 412. This can be measured by the receiver using a BW measurement process.

3. Jitter: Jitter of the data received from peer.

4. Latency: Latency of the data received from the peer.

5. RSRP: RSRP is the linear average of the downlink reference signals across the channel bandwidth.

6. RSRQ: LTE RSRQ that indicates quality of received reference signal. RSRQ measurement and calculation is based on RSRP and RSSI as shown below in Equation (1) since RSRP determines signal quality and RSSI determines co-channel interference and noise. RSRQ formula is shown below (N represents number of resource blocks)

$$RSRQ = \frac{RSRP}{RSSI} * N \quad \text{EQUATION (1)}$$

7. RSSI: WiFi RSRQ.

The GridRaster-IntelliStub 408 may periodically send following three parameters to each peer:

1. Disable compression: This can be used to reduce the delay involved in compression and decompression while the link can transmit the frames per second generated by peer.

2. Frame index: The ith frame that needs to be generated by peer. Peer will receive the frames per second requirement of receiver from central server.

3. Encoder bit rate and resolution change: This will be dependent upon type of video encoder in use.

Peer handling of GridRaster-IntelliStub data will process the data received from the scheduler of the IntelliStub 408 as follows:

1. Disable compression: Disable video compression and transmit raw image data to receiver.

2. Frame index: Peer will receive FPSreceiver and FPSpeer from central server. Peer will generate FPSreceiver per second starting from Frame index offset of from a global reference clock.

3. Encoder bit rate and resolution change: Change the encoding rate and resolution of the video compression.

GridRaster-Active Client Database 410

This component stores the active client database which are communicating with the peer. The following are the functions.

1. Communicate control messages/Data to all the peers. This will hold socket structures for communication with the peers.

2. Store per client information like Network latency, ERROR rate, Carrier signal strength, CPU information, memory usage, current battery power information.

3. Mark peers not usable based on GridRaster Intelligence; this will use help from GridRaster_Intellistub. Also let other peers know if there is any confirmation change.

FIG. 6 illustrates more details of the ReSequencer Packet data unit (GRPDU) 412 that is part of the grid raster network and system. The GridRaster-ReSequencer 412 is the component that delivers the packets received from different peers in correct order to the game. Different peers will have different delays so packets generated from different peers will arrive at/on the receiver with different delays. The component holds the packets and delivers them in sequence to the application. Using an output buffer; which includes a reordering window that is proportional to the maximum delay among the peers.

GridRaster ReSequencer Packet Data Unit (GRPDU) 412

This component is the protocol data unit for all types of data control and game data. The GRPDU stores the following types of data:

GRPDU sequence Number—Sequence number of the frame. Its size is 32 bits. Each peer generates the sequence number from the Starting sequence number and gapindex. i.e. if Starting sequence, no is SN and gapindex is gpi then it generates frames SN+gpi, SN+gpi+gpi, SN+gpi+gpi+gpi GPI—Gap index of frames that will be generated given a sequence Number. Ideally this is controlled by number of peers.

Type (bit#0)—Type of the packet—0 is data and 1 is control

Presentation timestamp—GMT timestamp when this packet will displayed at the destination.

Input timestamp—GMT time stamp when last input based on which the packet is generated is received.

Data—is frame that is generated.

ReSequencer—Transmit Side Variables

Each transmit side maintains the following parameters.

GRPDU-TX-VT-SN: Sequence number to be assigned for the next newly generated packet.

GRPDU-TX-GPI: gap index that was used to generate the sequence number

GRPDU-TX-Input time stamp: last input time stamp that was used to generate the frame.

ReSequencer—Receive Side Variables

Each transmit Receive side maintains the following parameters.

GRPDU-RX-UR receive state variable, value of the SN of the earliest PDU that is still considered for reordering (i.e. is inside reordering window)

GRPDU-RX-UX T_reordering state variable, value of the SN following the SN of the PDU which triggered T_reordering. In other words, it is the SN of the highest received PDU after the missing PDU at the time when GRPDU-RX-UX is set.

GRPDU-RX-UH highest received state variable, value of the SN following the SN of the PDU with the highest SN among received PDUs. Basically this means that if SN=X is highest received PDU, GRPDU-RX-UH is set to X+1. Upper edge of reordering window is same as VR(UH).

ReSequencer—Receive Side Constants:

GRPDU window size: This constant tells reordering window size. Its size is 2 bytes.

ReSequencer—Receive Side Timers:

T_reordering: This timer is used in order to detect loss of PDUs at lower layer. It is started when missing PDU is detected, only one T_reordering timer can be active at the time.

ReSequencer—Transmit Side Procedure:

As the packets are received it puts the packets in the GRPDU format and then send it. On initialization the values will be set to default initialization. will be incremented with each packet that is transmitted. When delivering a new packet to lower layer, the transmitting ReSequencer shall:

set the SN of the packet to GRPDU-TX-VT-SN, and then increment GRPDU-TX-VT-SN by one.

set the Presentation Timestamp of the packet relative to a global reference clock.

set the Input TimeStamp of the packet to the timestamp of the last input processed and applied by the game logic.

ReSequencer—Receive Procedure:

The output of the procedure is the PDUS in the output queue from where the renderer picks up frames sequentially. The following are the cases for receiving the PDU and when reordering expires.

Figure 7:
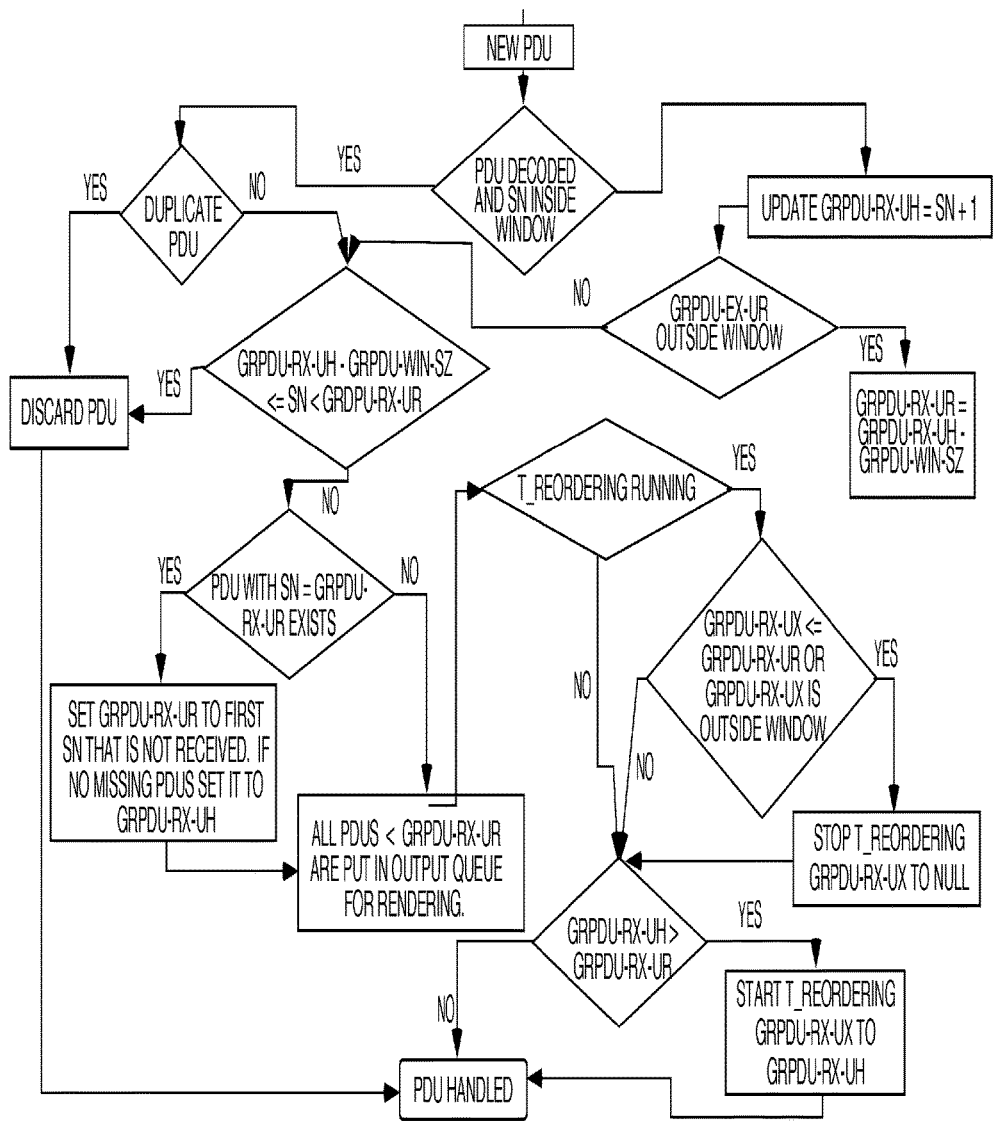
FIG. 7 illustrates an example of a reSequencer Receive Procedure.

FIG. 7 illustrates an example of a reSequencer Receive Procedure. The module performs the following processes:

1. It maintains a window of frames to be displayed.
2. Any new frame it receives the following actions are taken
   a. If not in window discard the frame
   b. If in sequence insert in the appropriate location
   c. Move the window and then put the frames received in order to the queue which can be used by Intellistub 408.

Figure 8:
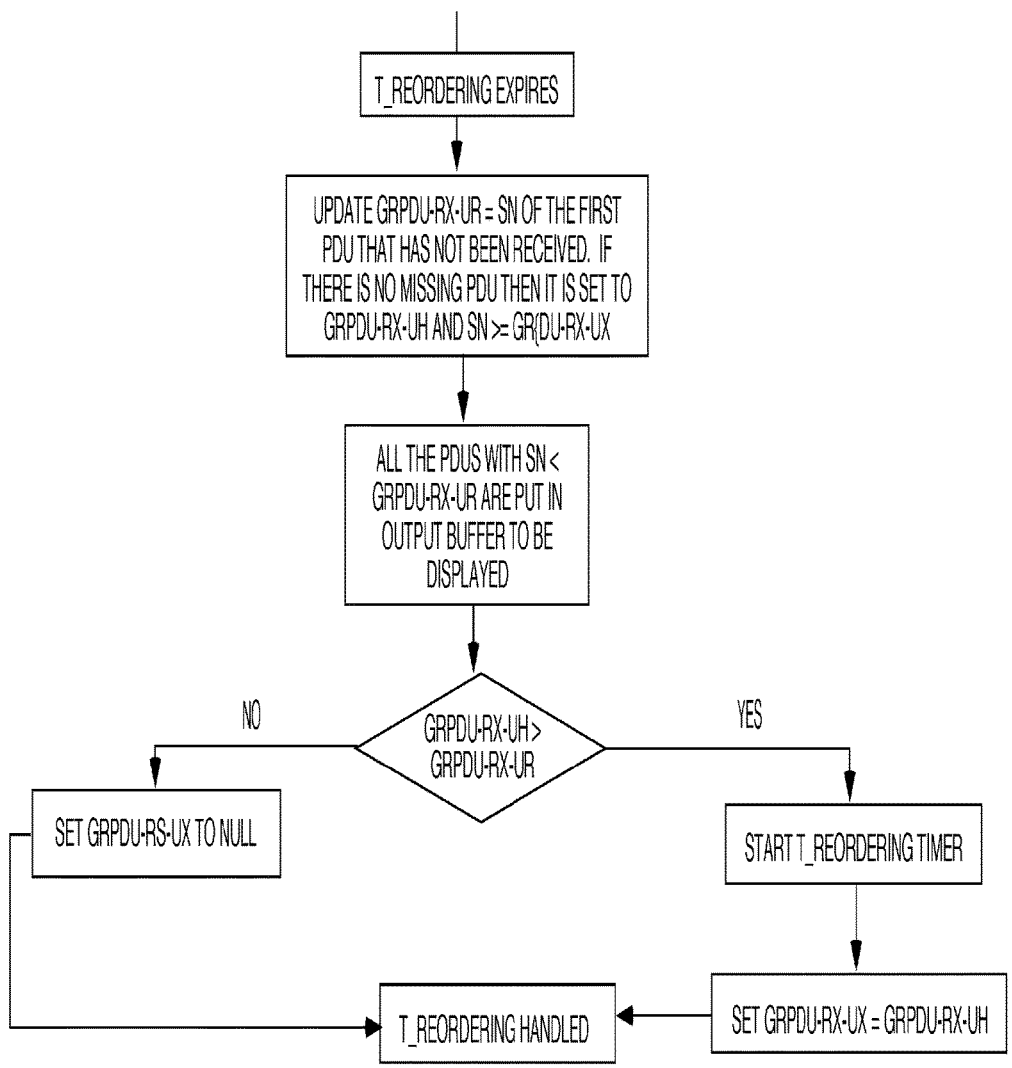
FIG. 8 illustrates actions taken when T-reordering expires.

FIG. 8 illustrates actions taken when T-reordering expires. When the timer expires the current window moves and packets which are in sequence are delivered to the output queue. At same time the timer is restarted if there are any missing packets.

Figure 9:
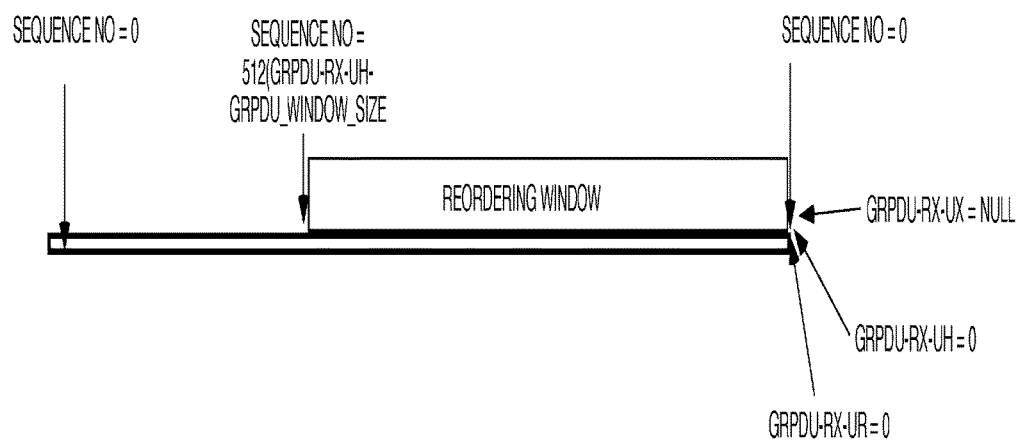
FIGS. 9 and 10 illustrate examples of the re-ordering implemented by the gridraster network and system.
Figure 10:
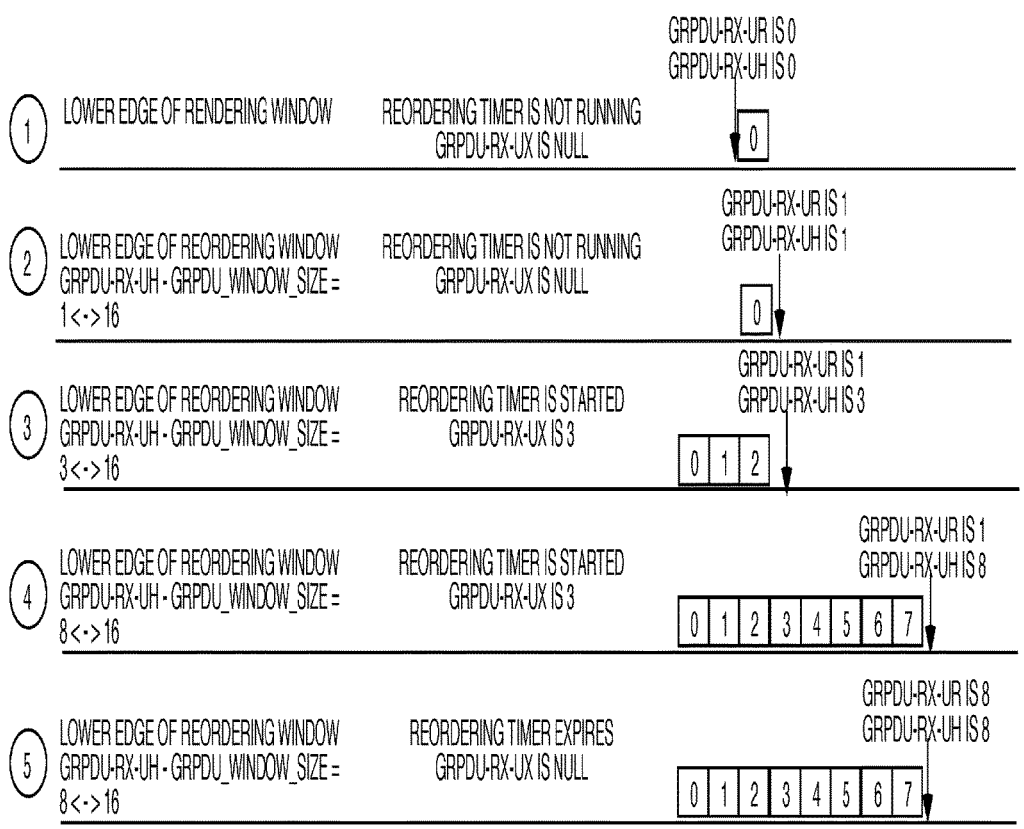

FIGS. 9 and 10 illustrate examples of the re-ordering implemented by the gridraster network and system. These figures show how the variables change in the following example.

Initially it will look as shown in FIG. 9. Say window size is 16 and the system misses getting packet with sequence no 1, the flow is shown in FIG. 10. FIG. 9 shows an example of the initial values of the variables when the window size is 512. FIG. 10 explains how the variables are updated based on the packets received. For example GRPDU-RX-UR is set to first missing packet and that's when reordering timer is started. GRPDU-RX-UX is always the next packet that is expected in the window. This variable is the highest packet number received till now.

Actions when Application Requests for Packets

This action takes input parameters like the last input timestamp and current time in GMT. Using this inputs, it iterates over the output buffer and picks up the first render frame where the input time stamp matches and presentation time stamp is later than input time stamp.

Video and Audio Sync

Video and audio sync will be performed using methods already used for common video and audio lip synch methods that are based on PTS.

Figure 11:
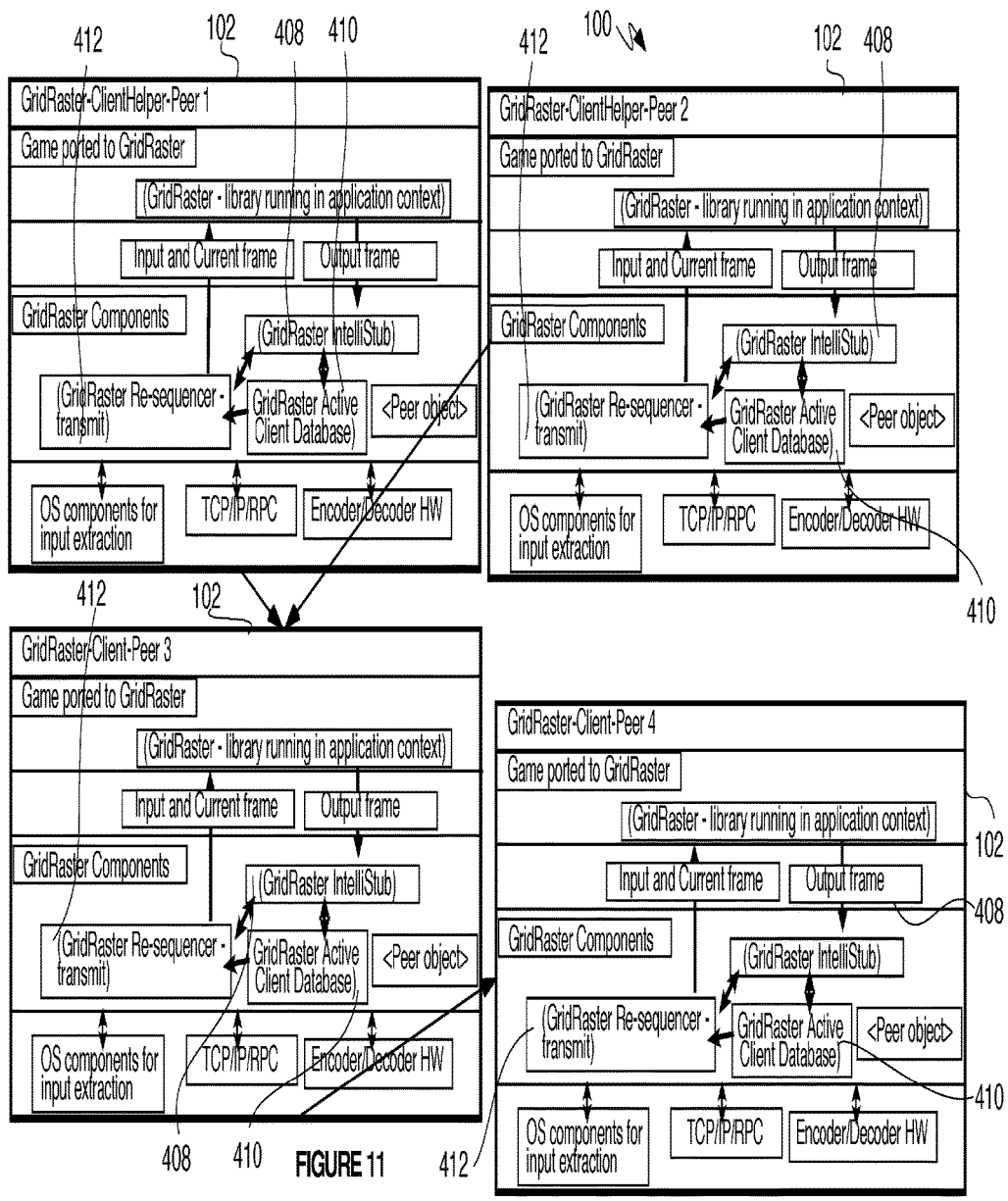
FIG. 11 illustrates more details of the grid raster network and system being used for a different purpose.

FIG. 11 illustrates more details of the grid raster network and system being used for a different purpose. In this use case example, there may be four peers as shown. Each peer has the same client and the same elements as described above and operates in a similar manner as described above. In this use case example, the problem is that Peer 4 does not have enough computing power to render a high quality game. Peer 4 also has only one video decoder and its wireless link is not strong enough to transmit the frames without encoding.

The system shown in FIG. 11 provides a solution in which GridRaster-IntelliStub 408 finds Peer 3 and constructs this model/scenario. Stream the game from peer 1 and peer 2 to peer 3. Peer 3 combines the frame and sends a single encoded video stream to Peer 4.

1. The configuration can be partitioned into Scenario 1 and forward the frames to Peer 4.
2. Peer 4 and Peer 3 establish the connection. Here Peer is both Gridraster-ClientPeer to peers 1 and 2 and GridRaster-ClientHelper to Peer 4
3. Peer 4 informs Peer 3 to initiate the game.
4. Peer 3 follows Scenario 1 to output the frames which will be encoded and then transferred to Peer 4 using sockets or other IPCs like message queues if on local PC.
5. Peer 4 decodes the frames and outputs.
6. Peer 4 runs the resequencer as presented in Scenario 1. It gets inputs from peer 3.
7. The following is the model which it will be transformed to.

Figure 12:
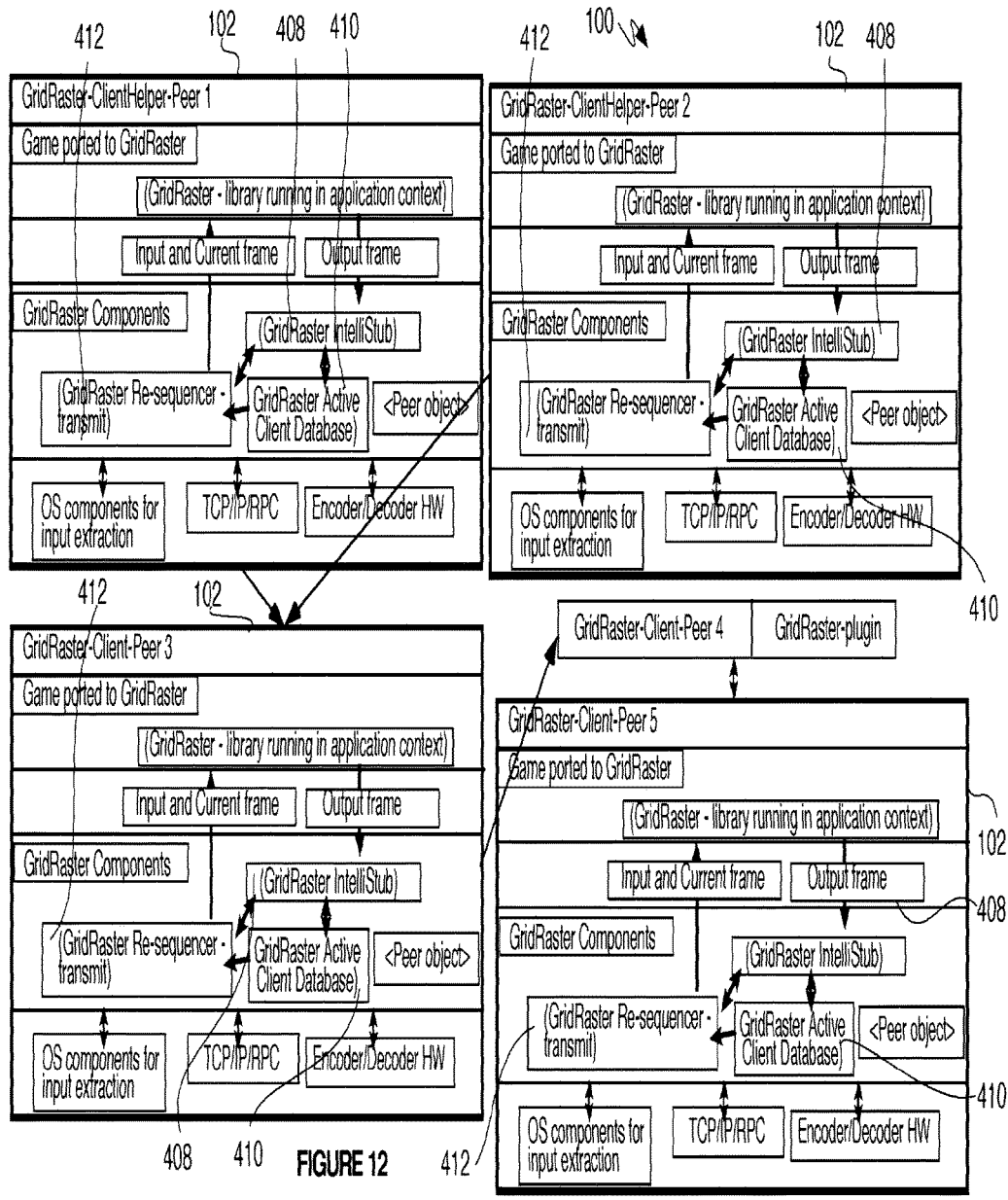
FIG. 12 illustrates more details of the grid raster network and system being used for a different purpose.

FIG. 12 illustrates more details of the grid raster network and system being used for a different purpose. In this use case example, there may be four peers as shown. Each peer has the same client and the same elements as described above and operates in a similar manner as described above. In this use case example, the problem is that Peer 4 does not have enough computing power to render a high quality game. Peer 4 also does not have enough video decoders to receive video streams from multiple peers and wireless link is not strong enough to receive the video frames from all the peers without compression.

The system may provide a solution which involves:
1. Peer 1 and peer 2 act as a GridRaster-Client Helper 304.
2. Game is streamed from Peer 1 and Peer 2 to Peer 3; Peer 3 is GridRaster-ClientPeer 302 for Peer 1 and Peer 2
3. Peer 3 sends the single encoded video stream to Peer 4. Here Peer 4 GridRaster-ClientPeer 302 and Peer 3 is GridRaster-ClientHelper 304.
4. If there is a peer 5 then it can stream the game directly to Peer 4.

Figure 13:
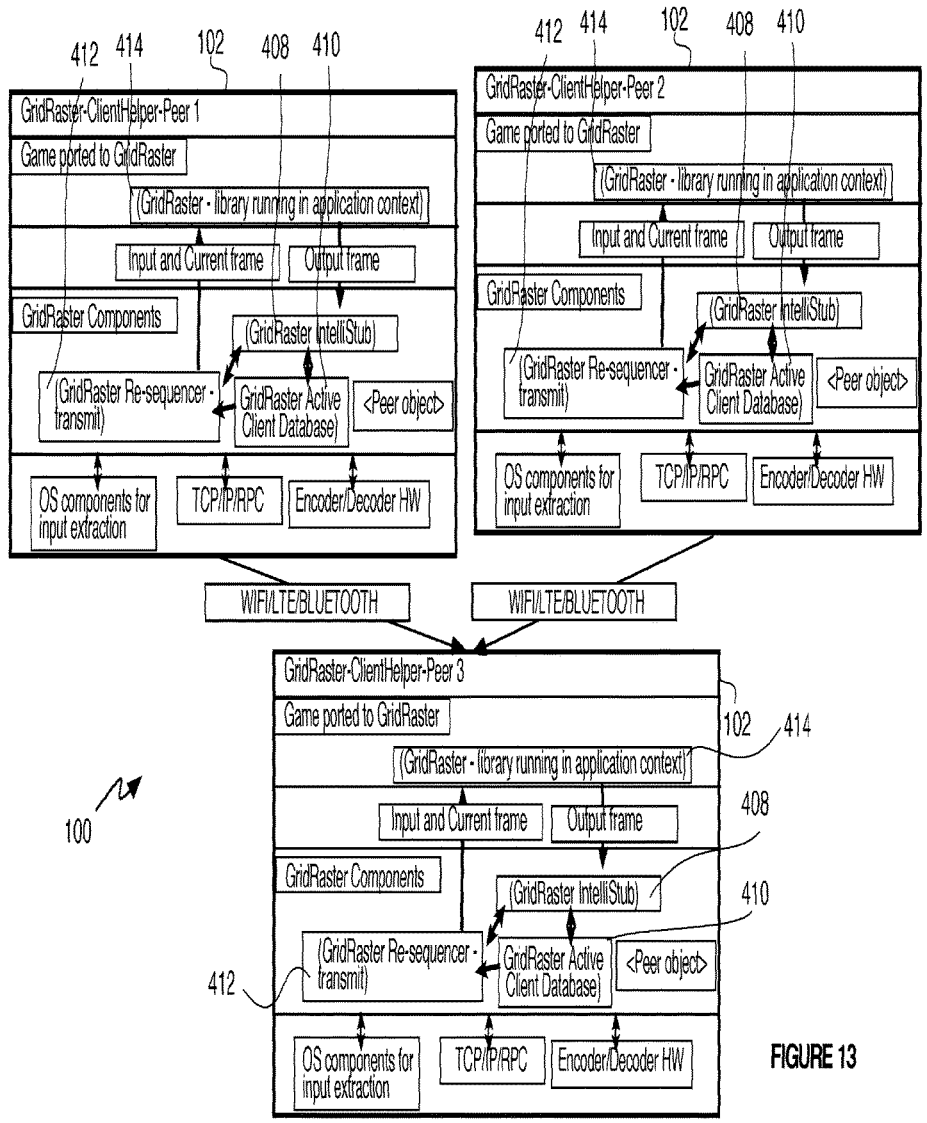
FIG. 13 illustrates more details of the grid raster network and system being used for a different purpose.

FIG. 13 illustrates more details of the grid raster network and system being used for a different purpose. In this use case example, there may be four peers as shown. Each peer has the same client and the same elements as described above and operates in a similar manner as described above. In this use case example, the problem is streaming a game over multiple network technologies. Peer 3 does not have enough computing power to render a high quality game. Peer 3 does not have strong enough link with other peers. This is scenario 1 with different technologies.

The system provides a solution which involves:
1. Peer 1 and peer 2 act as a GridRaster-Client Helper 304.
2. Game is streamed from Peer 1 and Peer 2 to Peer 3; Peer 3 is GridRaster-ClientPeer 302 for Peer 1 and Peer 2
3. Peer 1 streams the game over WIFI and Peer 2 Streams the game over LTE.
4. GridRaster-Intellistub 408 in Peer 3 will direct the GridRaster-Client peers 302 to generate video/audio.
5. The connectivity can be using different technologies like WIFI/LTE/Ethernet/bluetooth etc.

Figure 14:
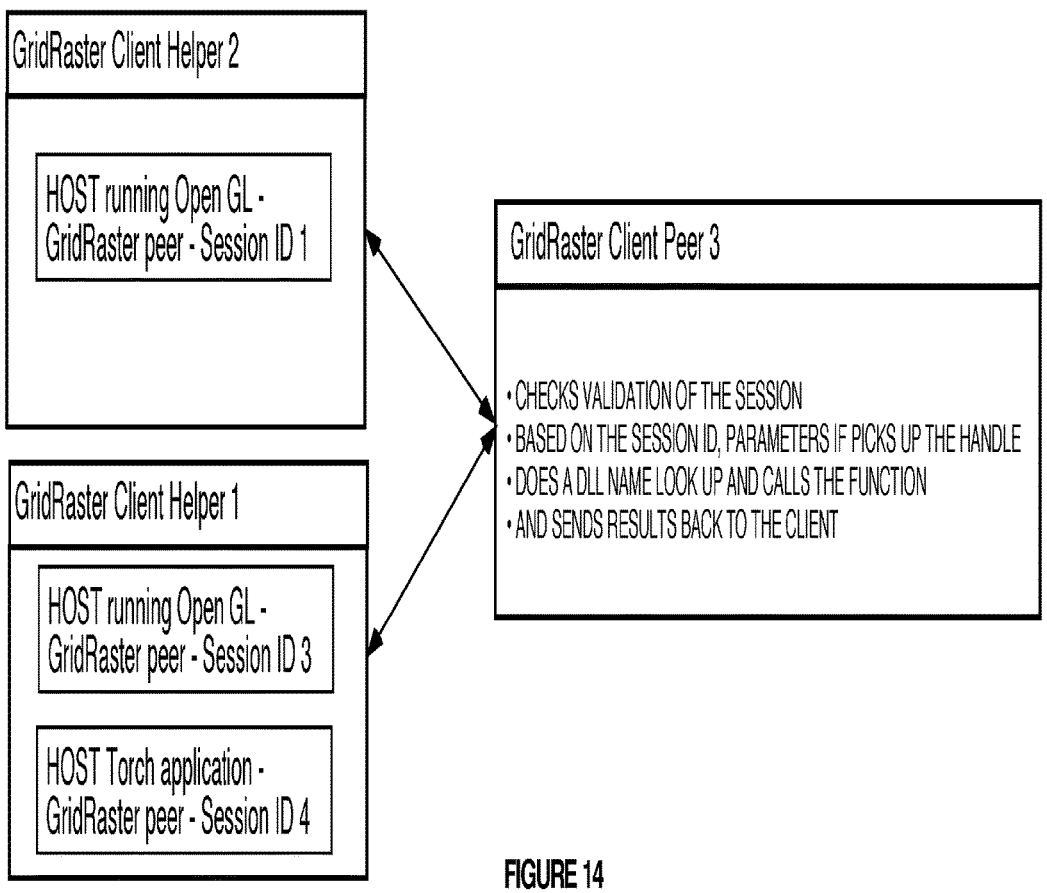
FIG. 14 illustrates a different implementation of the grid raster network and system of FIG. 13.

FIG. 14 illustrates a different implementation of the grid raster network and system of FIG. 13. In this use case example, there may be three peers as shown. Each peer has the same client and the same elements as described above and operates in a similar manner as described above. In this use case example, the problem is the remote tasklet execution of some parts of gaming execution. To start with the idea is that each Tasklet peer will spawn a thread/process on the remote client with a handle with its own execution space. That way the hardware is in the remote machine and parameters are from the host which display the output. The idea of remote execution relies on the fact of DLL name look up and holding the remote context of the peer example a dll handle. An example is to open a handle for OpenGL.

The process may include:
1. When the peers establish a connection that relevant DLL handle is opened in the client memory which will run the execution.
2. Once successful the when there is a call at a function level the session id, name of the function and parameters as a TLV is sent to remote. Thus the visualization of service as a DLL will make it task agnostic. So this can be applied to Torch, OpenGL etc without any issues.
3. The remote client gets the session ID and name of the function. Does a DLL lookup and then executes that function in the memory.

PLEASE LOOK AT https://en.wikipedia.org/wiki/Dynamic loading void* initializer=dlsym(sdl_library,"SDL_Init"); is way of looking for that function and then execute once we have results get them and transport it to client.

We will have to see which can be sent to client based on our requirements.

4. To transfer the parameters that are changed we can use the RDC or Remote differential compression techniques. One way is to do A EXOR B and send the differences in a compressed format and decompress it at the other side and EXOR to get the result.
5. Remote Differential Compression https://msdn.microsoft.com/en-us/library/Aa372948(v=VS.85).aspx
6. This can be mostly used for remote applications to run.

In an alternative implementation shown in FIG. 14, the system can also run the DLL on client without a command from tasklet peer. This will be the case in gaming where uploading large textures will take long time so we will have the DLL having all the data uploaded when the client connects to a peer and then input will be send to all the peers to keep them synchronized.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A system, comprising:
   a plurality of computers, wherein each computer acts as one of a client peer and a client helper peer;
   a network that connects the plurality of computers so that the plurality of computers communicate with each other over the network;
   each computer having at least a renderer component, a resequencer packet data component that resequences frame of data received by the computer and at least one encoder/decoder component that perform an action;
   wherein each of the client helper peers decode a frame of data for a process being executed by the client peer and provide the decoded frame data to the client peer; and
   wherein the client peer receives the decoded frame data from each client helper peer, resequences the decoded frame data from each client helper peer using the resequencer packet data component and executes a process using the resequenced decoded frame data.

2. The system of claim 1, wherein each computer further comprises an intellistub component that manages the process when the computer is acting as the client peer and a resequencer component that accumulates the data from the client helper peers and resequences the accumulated data provided from the client helper peers when the computer is acting as a client peer.

3. The system of claim 2, wherein the intellistub component on a computer schedules a video rendering from the client helper peers when the computer is acting as a client peer.

4. The system of claim 1, wherein the action of the client helper peer is decoding video data and wherein providing the data further comprises sending a video frame to the client peer.

5. The system of claim 1, wherein the process is one of gaming and virtual reality.

6. The system of claim 1, wherein the network is a wireless network.

7. A method, comprising:
   providing a plurality of peers, wherein each peer acts as one of a client peer and a client helper peer and a network that connects the plurality of peers so that the plurality of peers communicate with each other over the network, wherein each peer has at least a renderer component, a resequencer packet data component and at least one encoder/decoder component that perform an action;
   decoding, by each of the client helper peers, a frame of data for a process being executed by the client peer;
   providing, by each client helper peer, the decoded frame data to the client peer;
   receiving, by the client peer, the decoded frame data from each client helper peer;
   resequencing, by the client peer using the resequencer packet data component, the decoded frame data from each client helper peer; and
   executing the process using the resequenced decoded frame data.

8. The method of claim 7 further comprising managing, by an intellistub component in the client peer, the process, accumulating, by a resequencer in the client peer, the data from the client helper peers and resequencing, by a resequencer in the client peer, the accumulated data provided from the client helper peers.

9. The method of claim 8 further comprising scheduling, by the intellistub component of the client peer, a video rendering from the client helper peers.

10. The method of claim 7, wherein the action of the client helper peer is decoding video data and wherein providing the data further comprises sending a video frame to the client peer.

11. The method of claim 10, wherein performing the process further comprises sequencing the video frames and displaying the video frames.

12. The method of claim 7, wherein the process is one of gaming and virtual reality.

13. The method of claim 7, wherein providing the data further comprises providing the data using a wireless network.

* * * * *